United States Patent [19]

Lazzari

[11] 4,315,291

[45] Feb. 9, 1982

[54] MAGNETIC TRANSDUCTION DEVICE WITH MAGNETORESISTANCES

[75] Inventor: Jean-Pierre Lazzari, Montfort l'Amaury, France

[73] Assignee: Compagnie Internationale pour l'Informatique CII-Honeywell Bull (Societe Anonyme), Paris, France

[21] Appl. No.: 104,852

[22] Filed: Dec. 18, 1979

[30] Foreign Application Priority Data

Apr. 25, 1979 [FR] France ................................ 79 10562

[51] Int. Cl.³ .......................... G11B 5/22; G11B 5/20; G11B 5/30
[52] U.S. Cl. .................................. 360/113; 360/120; 360/123; 360/125
[58] Field of Search ................ 360/113, 112, 120, 123, 360/125, 122

[56] References Cited

U.S. PATENT DOCUMENTS

| Re. 29,326 | 7/1977 | Lazzari | 360/125 |
| 3,887,945 | 6/1975 | Nepela et al. | 360/113 |
| 3,921,217 | 11/1975 | Thompson | 360/113 |
| 4,190,872 | 2/1980 | Jones, Jr. et al. | 360/123 |

OTHER PUBLICATIONS

IBM Tech. Disc. Bull., L. T. Romankiw et al., Thin Film and Thin Film Ferrite Hybrid Magnetic Heads, vol. 18, No. 1, Jun. 1975, pp. 19-22.
IBM Tech. Disc. Bull., S. H. Smith, Magnetoresistive Magnetic Head, vol. 18, No. 1, Jun. 1975, p. 24.
IBM Tech. Disc. Bull., G. W. Brock et al., Magnetoresistive Read/Write Head, vol. 15, No. 4, Sep. 1972, pp. 1206-1207.

Primary Examiner—Alfred H. Eddleman
Attorney, Agent, or Firm—Kerkam, Stowell, Kondracki & Clarke

[57] ABSTRACT

A magnetic transduction device for reading and/or writing of data contained on a magnetic support such as a disc or magnetic tape comprises a magnetic circuit formed by two thin superposed magnetic layers magnetically coupled at one end and forming an air gap at the other end, and a coil between said thin magnetic layers formed by thin conductive layers separated by thin insulating layers. At least one of the thin conducting layers comprises at least one magnetoresistance.

4 Claims, 17 Drawing Figures

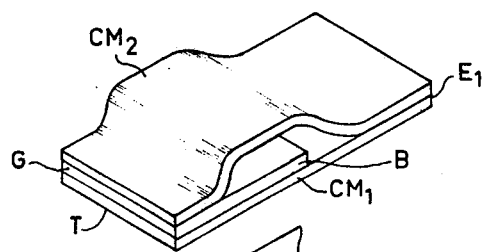
Fig. 1a
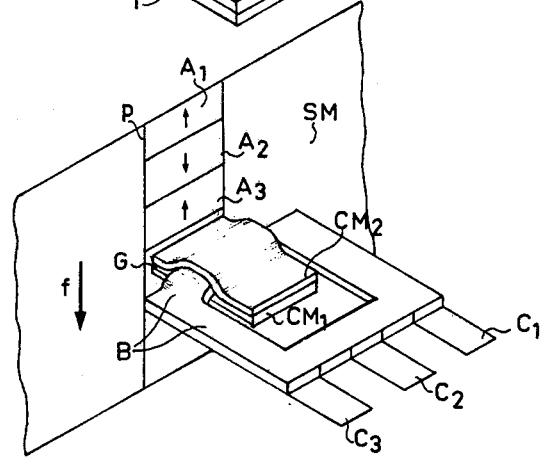
Fig. 1b
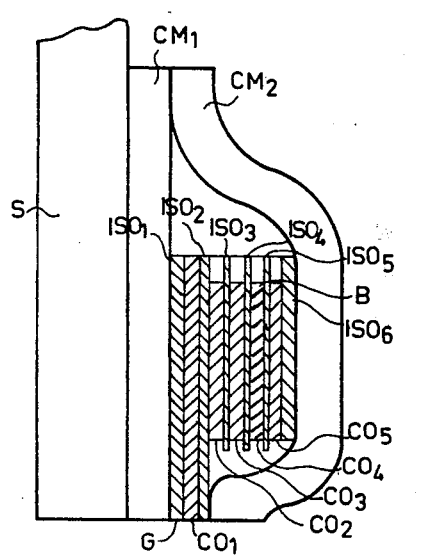
Fig. 1d
Fig. 1c
Fig. 1

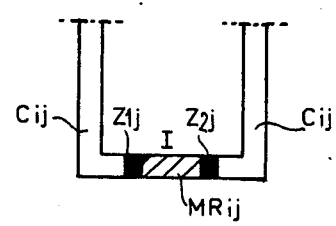
Fig. 4a
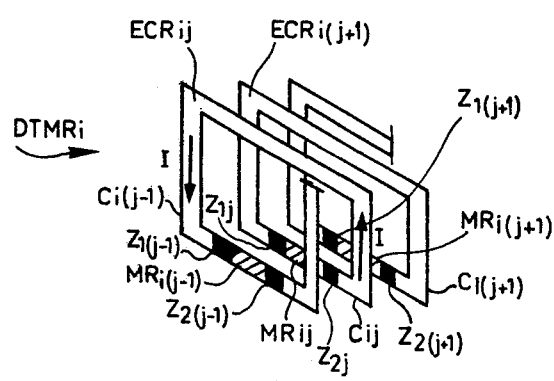
Fig. 4b
Fig. 4

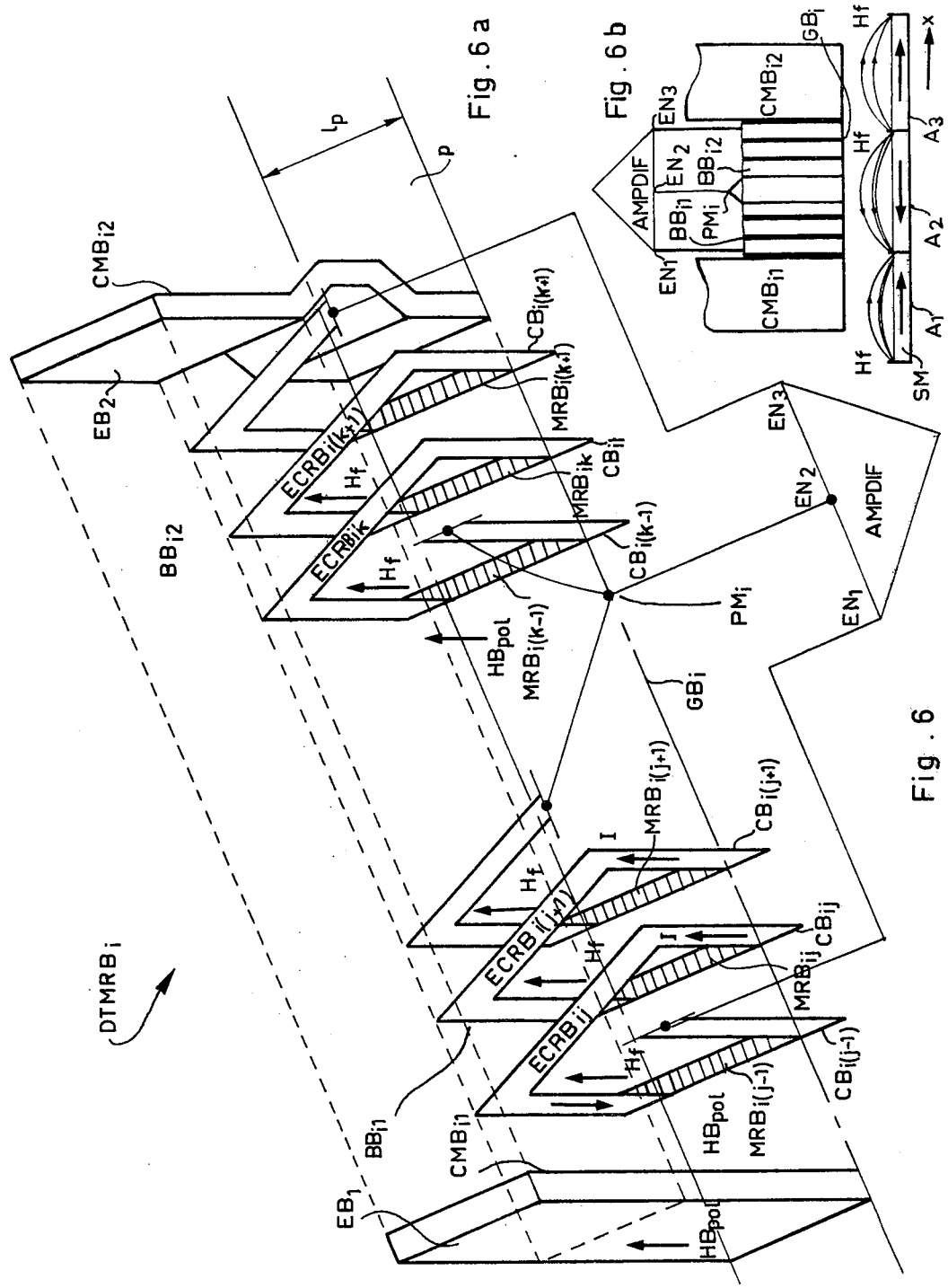

MAGNETIC TRANSDUCTION DEVICE WITH MAGNETORESISTANCES

BACKGROUND OF THE INVENTION

1. Field of the Invention

The present invention relates to a magnetic transduction device with magnetoresistances. It is principally applicable to the reading and/or writing of data contained on magnetic recording supports such as rigid or flexible magnetic discs and tapes.

2. Description of the Prior Art

It is known that, when recording (also known as writing) data on a magnetic recording support, at least one modification of one of the magnetic properties is created on (or in) this support at a number of precisely determined positions on the latter, which is translated by at least one variation of the physical quantity which characterizes the magnetic property. Reading of this data is carried out by detecting the modifications and by transforming the variation of the physical quantity defined above into a variation of another physical quantity which, most often, is the variation of the voltage or current of an electric signal.

The magnetic property used to record data on a magnetic support is defined, for example, either by the absence or presence of a magnetic induction or by the sign of the latter or again by its direction.

It is known that magnetic discs carry data on concentric, circular recording tracks which have a radial size not exceeding a few hundredths of millimeters and generally covering the larger part of their two faces. Magnetic tapes, on the other hand, carry data on tracks parallel to the length of the tape. Generally a series of magnetic data recorded on a track of a magnetic disc or tape is in the form of a succession of small magnetic areas called "elementary areas" distributed over the whole length of the track and having magnetic inductions of the same module and in opposite directions.

The means which permit either recording data on the discs or tapes, or reading it, or even carrying out both these two functions are called magnetic transduction devices or read/write heads. Generally one or more magnetic transduction devices are associated with a given recording support, the support moving past said device or devices.

There are two main types of magnetic transduction devices used in current practice.

These are: (1) transduction devices which are called "magnetic transducers", and (2) transduction devices comprising one or more magnetoresistances which will be designated as "magnetoresistance transducers".

Magnetic transducers comprise a magnetic circuit formed by a pair of adjacent magnetic arms around which is disposed a winding and which comprises an air gap at one end. The variation of the induction within the air gap of such a transducer permits the reading and/or recording of the data contained on the support associated with this transducer. The winding includes electric input and/or output wires. When the data of a given support passes in front of the air gap of the transducer associated with it, the latter delivers electric signals by means of its electric input and/or output wires. Conversely if its winding is supplied by an electric current which can be varied in direction or the duration of passage in the winding, data is recorded on the said support.

The current trend in development of magnetic transducers is to produce transducers with smaller and smaller dimensions (for example with air gaps of the order of a few microns in size) according to the techniques used in the manufacture of integrated circuits as shown, for example, in French Pat. No. 2,063,693 and U.S. Pat. Nos. 3,723,665; 3,846,841 and 4,012,752.

Such transducers generally comprise a magnetic circuit formed by two thin magnetic layers connected at one end so that they are magnetically coupled, the other ends of which are adapted to be arranged close to the recording support associated with the transducer and spaced from each other so as to form an air gap. The air gap is usually located a few tenths of microns from the support. The support is practically perpendicular to these layers.

An electric coil is formed between the thin magnetic layers by thin conducting layers superposed in a direction perpendicular to the plane of the magnetic layers so that the latter form an envelope containing the conducting layers. The conducting layers are separated from each other by thin electrically insulating layers. Layers, whose thickness is of the order of a few tenths of microns to a few microns are generally designated as thin layers and such transducers are commonly referred to as thin film magnetic heads. See for example, U.S. Pat. No. 4,052,744.

Such integrated magnetic transducers have the advantage of very low cost and they can read and/or write data both on magnetic tapes having a high density of longitudinal data (number of data per unit of tape length as well as on high radial and longitudinal density magnetic discs. The radial density of a magnetic disc is the number of tracks per unit length measured along a diameter of the disc, the longitudinal density being, therefor, defined by the number of data per unit length measure along the circumference of a track.

The disadvantage of integrated magnetic transducers or thin film magnetic heads is that the voltage of the signal which they deliver (usually a few fractions of tenths to a few tenths of millivolts) when the magnetic support data goes past them is proportional to the speed of movement of the support, this is considered particularly disadvantageous when the speed of movement of the support is low (the transducer output voltage is then too weak: less than 0.1 millivolts) or the variations in speed of the support are large.

Under these circumstances it is usually preferable to use magnetoresistance transducers.

Magnetoresistances are electric resistances in the form of a very thin layer or thin film (between several hundred angstroms to several microns in thickness) whose length is much greater than the width. Often these magnetoresistances are placed on a substrate of electrically insulating material. The value of their resistance varies when it is submitted to a magnetic field. Consider a magnetoresistance of value R connected to the terminals of a generator which delivers a current I circulating in the direction of the length of the magnetoresistance. Suppose that this magnetoresistance belongs to a magnetoresistance transducer associated with a magnetic recording support and that it is situated at a very short distance from the support (a few tenths of microns).

When each of the elementary areas of the support passes before it, the magnetic leakage field $H_f$ created by the area near the surface of the support causes a variation $\Delta R$ in its resistance, from whence occurs a variation in voltage $\Delta V$ equal to $I \times \Delta R$ at its terminals, which gives $\Delta V/V = \Delta R/R$, $\Delta R/R$ being called the "coefficient of magnetoresistance". This coefficient is usually of the order of 2% and is very often negative. The electric signal picked up at the terminal of the magnetoresistance has an amplitude dependent on the speed of the recording support.

To magnetize a magnetic material within which the magnetic induction is weak, it is first of all submitted to a positive magnetic field whose intensity is sufficient for the material to be saturated, i.e., the magnetic induction in the material reaches a limit value $B_s$. The external magnetic field is cancelled. Then a non-zero value magnetic induction known as "remanent induction" exists in the material as a characteristic of a material. The B/H relationship when H is extended towards 0 is known as initial magnetic permeability of the material. On the other hand, a magnetic anisotropic material situated in a plane presents therein two privileged directions of magnetization which are perpendicular to each other. One of them is called the "easy magnetization direction" while the other is called the "difficult magnetization direction". The initial permeability of the material in the difficult magnetization direction is much greater than the initial permeability of the material in the easy magnetization direction. The value of the magnetic field H which is applied to the material in its difficult magnetization direction, for which the latter is saturated in this direction, is called the anisotrophy field $H_k$.

Generally the magnetoresistances used are formed by a magnetically anisotropic material, for example, an iron/nickel alloy (18% iron, 82% nickel). Their axis of each magnetization is parallel to the direction of the current I and to their length, while their axis of difficult magnetization is perpendicular to the latter. The position of the magnetoresistance of a magnetoresistance transducer with respect to the recording support which is associated with it is such that the leakage field of the elementary areas is parallel to its axis of difficult magnetization.

It can be shown that the sensitivity of a magnetoresistance constituted by a magnetic anisotropic material, i.e., the voltage of its output signal, can be increased by submitting the latter to a magnetic polarization field $H_{pol}$ parallel to its axis of difficult magnetization as is described in U.S. Pat. No. 3,848,217.

The value of the polarization field $H_{pol}$ is chosen to be such that it can turn the easy magnetization axis of the magnetoresistance through an angle $\theta$, preferably in the region of 45°. In this case, it is shown that the sensitivity of the magnetoresistance is at a maximum that is to say that a given variation $\Delta H$ of the magnetic field to which it is submitted (other than the field $H_{pol}$), corresponds a maximum variation $\Delta R$ of its resistance and hence of its output voltage $\Delta V$.

The above-mentioned U.S. Pat. No. 3,848,217 describes a magnetoresistance transducer for reading magnetic data recorded on supports such as magnetic tapes or discs. This magnetoresistance transducer comprises a magnetoresistance disposed between the two polar parts of a magnet so that the latter creates the magnetic polarization field $H_{pol}$ of the magnetoresistance. Such magnetoresistance transducers are now used in current practice. Their magnetoresistance is disposed facing the support which is associated with them so that its length (its larger dimension) is perpendicular to the direction of travel of the support. Their height (measured perpendicular to the plane of the support) is of the order of 30 to 40 microns. The voltage of the signal delivered by the magnetoresistor when an elementary area of the support moves in front of it is of the order of a few tenths of millivolts and is, therefore, practically of the same size as that delivered by the magnetic integrated transducers.

Known magnetoresistance transducers cannot be used for writing or recording data on a magnetic recording support.

In conclusion, with respect to magnetic integrated transducers, the magnetoresistance transducers deliver a read signal, the voltage of which is more or less the same; have the advantage of having a read signal independent of the speed; and have the disadvantage that they cannot be used for writing data.

SUMMARY OF THE INVENTION

The present invention combines the advantages of the two types of transducers mentioned above while eliminating their disadvantages, by the insertion of a magnetoresistance into each of the conductors of all or part of the coil of a magnetic integrated transducer, the magnetoresistance being located in the air gap of the latter. There is thus formed a magnetic transduction device with magnetoresistances according to the invention, which can be used both for writing and for reading data. The output voltage of such a magnetic induction device according to the invention with respect to those of the magnetoresistance transducers and magnetic integrated transducers used in current practice, is multiplied by the number of magnetoresistances inserted in the conductors of the said coil. In effect, if m designates the number of magnetoresistances, the latter being connected in series (by means of the conductors of the coil), the overall resistance of all the magnetoresistances is equal to $m \times R$ (the magnetoresistances supposedly having the same resistance R).

When these magnetoresistances are submitted to the leakage field $H_f$ of an elementary area of the recording support associated with the transduction device into the invention, the total variation of overall resistance $m \times \Delta R$, and the resulting variation in voltage (the current I supplying the coil also circulating in the magnetoresistances) is equal to $m \times I \times \Delta R$, equal to $m \times \Delta V$.

According to the present invention a magnetic transduction device for reading and/or writing data contained on a magnetic support comprises a magnetic circuit formed by two thin superposed magnetic layers magnetically coupled at one end and spaced from each other at the other end to form an air gap therebetween. The other end is arranged close to the support, substantially perpendicular to the latter.

Between the thin magnetic layers is formed a coil of thin conductive layers which are superposed in a direction perpendicular to the plane of the magnetic layers and separated from each other by thin electrically insulating layers. At least one of the thin conductive layers includes at least one magnetoresistance situated in the air gap so as to be submitted to the magnetic leakage field of the data of the support.

BRIEF DESCRIPTION OF THE DRAWINGS

Other characteristics and advantages of the present invention will appear in the following text which is given by way of non-limiting example and with reference to the accompanying drawings.

In the drawings:

FIGS. 1 and 1a thru 1d show the construction of a magnetic integrated transducer for reading/writing data contained on a support and comprises FIGS. 1a and 1b which are three quarter perspective views; FIG. 1c which is a sectional view in a plane perpendicular to the magnetic support and parallel to the direction of movement of the support; and FIG. 1d which shows a thin layer conductor forming a turn of the coil of the transducer;

FIGS. 4 and 4a thru 4b illustrate the principle of the invention and comprises FIG. 4a which shows a thin layer conductor of the coil comprising a magnetoresistance; and FIG. 4b which shows some of the thin layer conductors of the coil, each of the conductors comprising a magnetoresistance;

FIG. 5b which is a view of the recording support;

FIGS. 6 and 6a thru 6b shows a second embodiment of the magnetic transduction device according to the invention; and comprises FIG. 6a which is an exploded three quarter perspective view; and FIG. 6b which is a partial sectional view.

DESCRIPTION OF THE PREFERRED EMBODIMENTS

Figure 2:
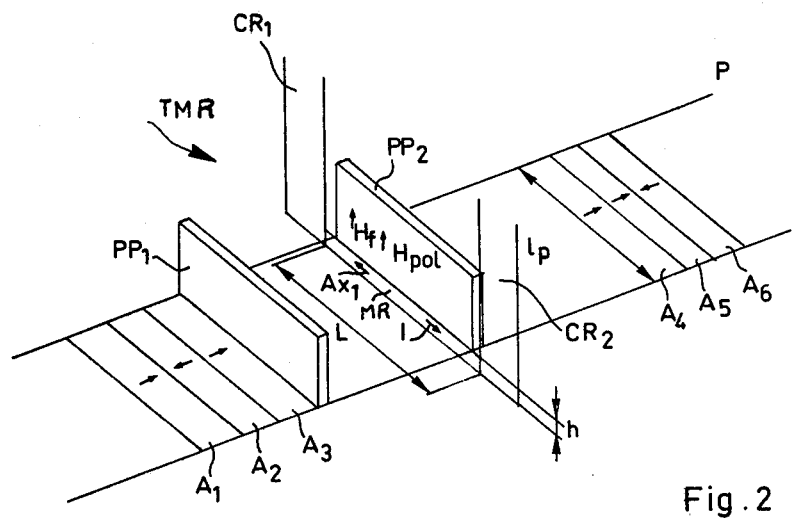
FIG. 2 shows the construction of a magnetoresistance transducer, the magnetoresistance of which is formed by a magnetic anisotropic material.
Figure 3A:
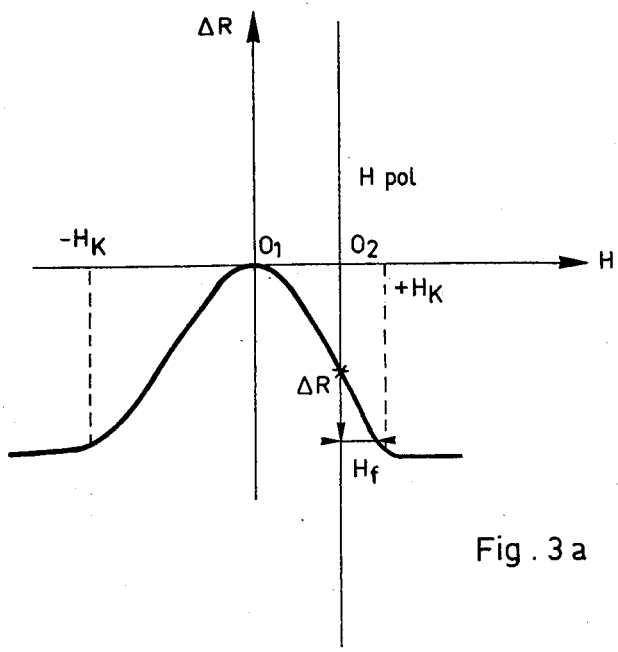
FIG. 3 and 3a thru 3b show the curve of variation of resistance of a magnetoresistance of magnetic anisotropic material as a function of the magnetic field applied to it in the direction of its axis of difficult magnetization, in order to understand the principle of polarization of a magnetoresistance.
Figures 3, 3B:
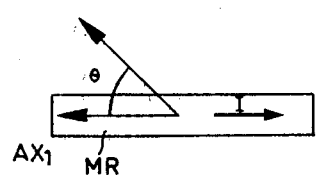

For better understanding as to how the magnetic transduction device with magnetoresistances according to the invention is formed it is useful to recall on the one hand, the integrated magnetic transducers illustrated in FIGS. 1a, 1b, 1c and 1d, and, on the other hand, the magnetoresistance transducers illustrated in FIGS. 2, 3a and 3b.

The magnetic integrated transducers have been described in U.S. Pat. No. 3,723,665, the subject matter of which is hereby incorporated by reference.

As can be seen from FIGS. 1a and 1b, which are perspective views of such a transducer T, the latter comprises a magnetic circuit composed of magnetic arms $CM_1$ and $CM_2$ which are completely superposed and magnetically coupled to a coil B. The arms $CM_1$ and $CM_2$ are magnetostatically coupled together at a first end $E_1$ and are spaced from each other at the other end to form the air gap G at the other end. The arm $CM_1$ is placed on an insulating substrate S as can be seen in FIG. 1c. In FIG. 1b the transducer T is shown positioned opposite a recording support SM of which only part has been shown for simplification. This support comprises a plurality of recording tracks of which only the track p is shown which comprises a plurality of elementary areas, of which three, namely areas $A_1$, $A_2$ and $A_3$, have been shown in FIG. 1c. The support SM is, for example, a magnetic disc belonging to a disc memory. It is known that disc memories are being used more and more often in data processing systems due to their storage capacity and the relatively short time taken by the read/write transduction devices to access data contained at any point on these discs from the moment when they receive the order to access this data from the said processing system.

These arms $CM_1$ and $CM_2$ are generally formed by a set of several thin magnetic layers and thin insulating layers, which are stacked with each magnetic layer being separated from the neighboring layer by an insulating layer. The assembly thus formed, whether it comprises one or several thin magnetic layers is usually designated by the general name of "thin magnetic layers". Thus the arms $CM_1$ and $CM_2$ can themselves be designated by the title "thin magnetic layers $CM_1$ and $CM_2$", the overall structure forming a thin film magnetic read/write head.

The coil B is formed by a series of thin conducting and insulating layers stacked in a direction perpendicular to the plane of the thin magnetic layers $CM_1$ and $CM_2$. A part of the conducting and insulating layers extend into the air gap G. Thus the coil B of the transducer T shown in FIG. 1c comprises the thin insulating layers $ISO_1$, $ISO_2$ to $ISO_6$ and the thin conducting layers (which will also be called thin conductors) $CO_1$, $CO_2$ to $CO_6$. It is seen that only the insulating layers $ISO_1$ and $ISO_2$ and the thin conductor $CO_1$ extend into the air gap G.

FIG. 1d shows a thin conductor such as $CO_2$. As explained and described in the above-mentioned U.S. Pat. No. 3,723,665, the thin conductors have the same shape but are of different dimensions. They are connected together by connecting conductor elements (not shown for simplification of FIGS. 1a to 1d).

The coil B generally comprises two to three output conductors (most often 3), i.e., in the embodiment described here, output conductors $C_1$, $C_2$ and $C_3$ which are connected to the electronic read/write circuits of the disc memory containing the disc SM.

FIG. 2 shows a magnetoresistance transducer TMR placed facing and close to a track p of a magnetic recording support SM which is taken as identical to that shown in FIG. 1b.

The transducer TMR shown in an exploded view so as to make the drawing more clear, comprises two pole pieces $PP_1$ and $PP_2$ which permit channelling of the leakage field created by each of the elementary magnetic areas of the support SM. A magnetoresistance MR of magnetic anistropic material of reistance R is located between the pole pieces $PP_1$ and $PP_1$. The distance between the pole pieces is of the order of a few microns. The size L of its magnetoresistance is slightly greater than the size of the track $1_p$, its height h (measured perpendicularly to the support SM) being, for example, of the order of 30 to 40 microns. The magnetoresistance MR is connected to two connection conductors $CR_1$ and $CR_2$ enabling its connection to the read circuits of the disc memory containing the support SM. Its axis $Ax_1$ of easy magnetization is parallel to its length and its axis of difficult magnetization is perpendicular to this large dimension. It is supplied by a current I which circulates, for example, in the direction indicated in FIGS. 2 and 3b, that is to say parallel to the easy supply axis $Ax_1$.

The magnetoresistance MR is submitted, on the one hand, to the magnetic leakage field H of the elementary magnets of the support (some of these magnets $A_1$ to $A_6$ are shown in FIG. 2) and on the other hand, to a polarization or biasing field $H_{pol}$ (produced by an external source which is not shown). These two fields are parallel to the difficult supply axis and perpendicular to the current I.

FIG. 3a, which shows the curve of variation ΔR of the resistance R of the magnetoresistance MR as a function of the magnetic field which is applied to it, allows a better understanding of the operation of the magnetoresistance transducer TMR.

For a value of H equal to the anistropic field $H_k$ of the material forming the magnetoresistance, with the material saturated in its direction of difficult magnetization, the resistance R no longer varies. It is possible to give the magnetoresistance MR maximum sensitivity by displacing the ordinate axis in FIG. 3a from the point of origin $O_1$ to point of origin $O_2$ by submitting it to the polarization field $H_{pol}$. In this case, if the leakage field $H_f$ of the elementary magnets to which it is submitted is relatively weak, the variation ΔR of its resistance is relatively large. It is shown that the axis of easy magnetization then makes an angle θ with the direction of the current I.

As can be seen in FIGS. 4, 5 and 6, a magnetic transduction device with magnetoresistances is formed, according to the invention, by inserting in at least one of the thin conductors forming the coil of the magnetic integrated transducer, such as that shown in FIG. 1, a magnetoresistance of anistropic material. Thus a magnetic transduction device $DTMR_i$, whose coil is $B_i$ is obtained. If n is the number of turns (i.e., the number of thin conductors of the coil) and if the number of thin conductors comprising a magnetoresistance is equal to m, the relationship $1 \leq m \geq n$ exists.

FIG. 4a, shows a thin conductor $C_{ij}$ of the coil $B_i$ which comprises an anisotropic magnetoresistance $MR_{ij}$. This is attached, for example by welding, to the conductor $C_{ij}$ by means of overlapping areas $Z_{1j}$ and $Z_{2j}$.

FIG. 4b shows a group of three thin conductors $C_{i(j-1)}$, $C_{ij}$, $C_{i(j+1)}$ of the coil $B_i$ comprising respectively the anisotropic magnetoresistances $MR_{i(j-1)}$, $MR_{ij}$, $MR_{i(j+1)}$.

The magnetoresistance $MR_{i(j1)}$, is attached to the conductor $C_{i(j-1)}$ by means of the overlapping areas $Z_{1(j-1)}$, and $Z_{2(j-1)}$. Similarly, the magnetoresistor $MR_{i(j+1)}$ is attached to the conductor $C_{i(+1)}$ by means of the overlapping areas $Z_{1(j+1)}$ and $Z_{2(+1)}$.

FIG. 4b also shows the connecting conductor elements $ECR_{ij}$ between the conductors $C_{i(j-1)}$, $C_{ij}$ and $ECR_{i(j+1)}$ between the conductors $C_{ij}$ and $C_{i(j+1)}$.

The current I supplying the conductors $C_{i(j-1)}$ to $C_{i(j+1)}$ as well as the magnetoresistances $MR_{i(j-1)}$ to $MR_{i(j+1)}$ circulates in the direction indicated in FIGS. 4a and 4b. If R is the resistance of each of the m magnetoresistances of the induction devices $DTMR_i$ according to the invention, the total resistance variation of the latter, when they are submitted to the magnetic leakage field $H_f$ of each of the elementary magnets of the recording support SM associated to the transduction device $DTMR_i$ (the support being taken as identical to the support shown in FIGS. 1b and 3a), will be $m \times \Delta R$ where ΔR is the variation of resistance of each of the magnetoresistances, the voltage variation resulting at the terminals of the group of m magnetoresistances being, therefore, equal to $m \times I \times \Delta R$ equal to $m \times \Delta V$.

It should therefore be appreciated that the larger the number m of magnetoresistances, the larger the signal delivered by the latter and, therefore, by the transduction device $DTMR_i$.

The device according to the invention can therefore supply read signals from the data contained on a recording support, the voltage of which is very much greater than that supplied by the magnetic integrated transducer such as T or the magnetoresistance transducers such as TMR.

Figure 5A:
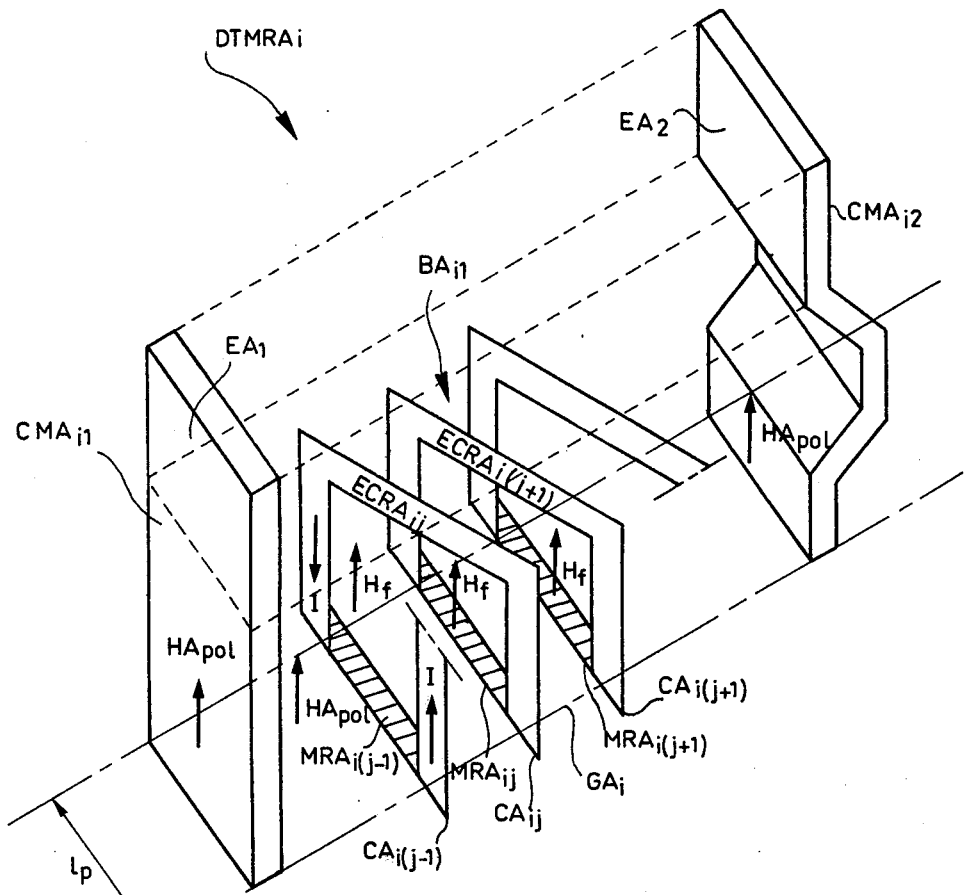
FIGS. 5a thru 5b show a first embodiment of a magnetic transduction device according to the invention; and comprises FIG. 5a which is an exploded three quarter perspective view.
Figure 5B:
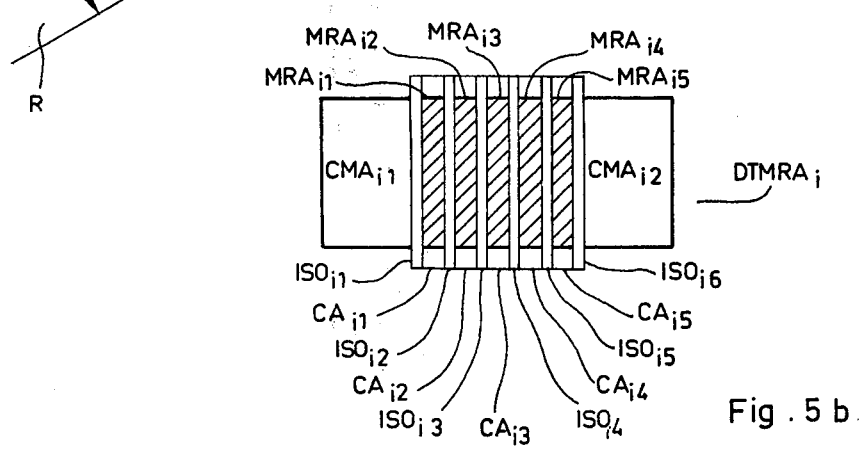

FIGS. 5a and 5b show a first embodiment $DTMRA_i$ of the magnetic transduction device according to the invention.

FIG. 5a is an exploded view giving greater clarity to the drawings. The device $DTMRA_i$ comprises a first and second thin magnetic layer $CMA_{i1}$ and $CMA_{i2}$ forming the pole pieces of the device $DTMRA_i$ which are magnetically coupled at their respective ends $EA_1$ and $EA_2$.

A coil $BA_{i1}$ of which only a part comprising the thin layers $CA_{i(j-1)}$, and $CA_{i(j+1)}$ is shown with its connecting conductor elements $ECRA_{ij}$ and $ECRA_{i(j+1)}$. For simplification of the figure, the insulating layers separating the thin conductors from each other are not shown.

The conductors $CA_{i(j-1)}$, $CA_{ij}$, $CA_{i(j+1)}$ comprise respectively the magnetoresistances of anisotropic magnetic material $MRA_{i(j-1)}$, $MRA_{ij}$, $MRA_{i(j+1)}$.

The current I circulates in the thin conductors of the coil $B_{i1}$ in the direction shown in FIG. 5a.

The magnetoresistances $MRA_{i(j-1)}$ to $MRA_{i(j+1)}$ are polarized by the field $HA_{pol}$ created by the coil $BA_{i1}$ in the magnetic circuit formed by the thin layers $CMA_{i1}$ and $CMA_{i1}$. These magnetoresistances are placed in the air gap $GA_i$ of the transduction device, which in operation is disposed facing and close to the recording support SM, of which the track p has been shown, the direction of motion of this support in front of the air gap being shown by the arrow f.

The magnetoresistances are parallel to the width $l_p$ of the track and perpendicular to the direction of travel. It is clear that the axes of difficult magnetization of the magnetoresistances are perpendicular to their large dimension (their length) and to the recording support SM, their axes easy magnetization (apart from any polarization) being parallel to their width and to the direction of current in the latter (these axes are perpendicular to the direction of movement of the support SM). The length of the magnetoresistances is slightly greater than $l_p$.

FIG. 5b is a view from below of the transduction device $DTMRA_i$ (view of the support SM) whose coil $BAxzi_1$ is shown as comprising five thin conductors $CA_{i1}$, $CA_{i2}$, $CA_{i3}$, $CA_{i4}$, $CA_{i5}$ comprising respectively the magnetoresistances $MRA_{i1}$, $MRA_{i2}$, $MRA_{i3}$, $MRA_{i4}$, $MRA_{i5}$. These conductors and magnetoresistances are separated from each other by insulating layers $ISO_{i1}$ to $ISO_{i6}$.

FIGS. 6a and 6b show a second embodiment $DTMRB_i$ of the magnetic transduction device according to the invention. FIG. 6a is an exploded view permitting clarification of the drawing. The device $DTMRB_i$ comprises a first and second thin magnetic layer $CMB_{i1}$ and $CMB_{i2}$ forming the pole pieces of the device $DTMRB_i$, connected magnetically at their respective ends $EB_1$ and $EB_2$. Two half sections $BB_{i1}$ and $BB_{i2}$ form the coil. Only one part of the half coil $BB_{i1}$ comprising the thin conductors $CB_{i(j-1)}$, $CB_{ij}$, $CB_{i(j+1)}$ is shown with its connecting conductor elements $ECRB_{ij}$ and $ECRB_{i(j+1)}$. Similarly only one part of the half coil $BB_{i2}$ comprising thin conductors $CB_{i(k-1)}$, $CB_{ik}$, $CB_{i(k+1)}$ is shown with its connecting conductor elements $ECRB_{ik}$ and $ECRB_{i(k+1)}$. For simplification of FIG. 6a, the insulating layers separating the thin conductors from each other are not shown. The two half coils $BB_{i1}$ and $BB_{i2}$ have a common electric point $PM_i$ of connection. The conductors $CB_{i(j-1)}$, $CB_{ij}$, $CB_{i(j+1)}$ comprise respectively the magnetoresistances of magnetic anisotropic material $MRB_{i(j-1)}$, $MRB_{ij}$ and $MRB_{i(j+1)}$. Conductors $CB_{i(k-1)}$, $CBxzi_k$, $CB_{i(k+1)}$ comprise respectively the anisotropic magnetoresistances $MRB_{i(k-1)}$, $MRB_{ik}$, $MRB_{i(k+1)}$. Current I, which is identical in the half coils $BB_{i1}$ and $BB_{i2}$, circulates in the thin conductors of the latter in the direction indicated in FIG. 6a.

The magnetoresistances $MRB_{i(j-1)}$ to $MRB_{i(j+1xz)}$, and $MRB_{i(k-1)}$ to $MRB_{i(k+1)}$ are polarized by the field $HB_{pol}$ created by the two half coils $BB_{i1}$ and $BB_{i2}$ in the magnetic circuits formed by the thin layers $CMB_{i1}$ and $CMB_{i2}$. These magnetoresistances are placed in the air gap $GB_i$ of the transduction device $DTMRB_i$. This air gap, in question, is located facing and close to the recording support SM of which the track p has been shown. The direction of movement of the support before this air gap being defined, for example, by the arrow $f_1$. The above-mentioned magnetoresistances are parallel to the width $l_p$ of the track and perpendicular to the direction of movement indicated by the arrow $f_1$.

It should be apparent that the axes of difficult magnetization are perpendicular to the length of the magnetoresistances and to the recording support SM, their axes of easy magnetization (apart from any polarization) being parallel to the length and to the direction of current in the latter.

The two half-coils $BB_{i1}$ and $BB_{i2}$ are connected to a differential amplifier AMPDIF belonging to the read/write circuits of the disc memory which contains the support SM in the manner indicated in FIGS. 6a and 6b, the center point $PM_i$ of the two half-coils $BB_{i1}$ and $BB_{i2}$ being connected to the central input $EN_2$ of the amplifier AMPDIF. Further, the ends of the coils $BB_{i1}$ and $BB_{i2}$ are connected respectively to the input $EN_1$ and $EN_3$ of the same amplifier. The distance between the two half-coils is substantially equal to the length of an elementary area.

When the point $PM_1$ is opposite the center of such an area, the magnetoresistances of each of the two half-coils being submitted to the same very weak magnetic field transmitted by this area in the neighborhood of its ends (see FIG. 6b), the amplifier AMPFIF supplies a zero voltage.

On the contrary, when $PM_i$ is situated opposite the boundary between the two elementary areas, the magnetoresistances of each of the two half-coils are submitted respectively to the leakage fields of the opposite sign and maximum value. The voltage supplied by AMPDIF is then a maximum. The transduction device $DTMRB_i$ therefore permits the bouindary to be located between two elementary areas, whose inductions are in opposite directions.

I claim:

1. A magnetic transduction device for reading and/or writing data contained on a magnetic support comprising:
    two thin superposed magnetic layers magnetically coupled at one end and adapted to be arranged at the other end close to the magnetic support and substantially perpendicular thereto, said layers being spaced from each other at said other end so as to form an air gap therebetween;
    a coil between thin magnetic layers, said coil comprising a plurality of thin conductive layers superposed in a direction perpendicular to the plane of the said magnetic layers and separated from each other by thin conductive layers having a part extending into said air gap and at least one magnetoresistance disposed in said part and situated in the air gap so as to be submitted to the magnetic leakage field of the data of the support.

2. A device according to claim 1, wherein each of said thin conductive layers includes a magnetoresistance situated in the air gap, said magnetoresistance being disposed in a part of each thin conductive layer situated in the air gap.

3. A device according to claim 2, wherein said coil comprises two half-sections having a common electric point of connection.

4. A device according to claim 1 wherein a plurality of said thin conductive layers include a magnetoresistance situated in the air gap, said magnetoresistance being disposed in a part of the associated thin conductive layer situated in the air gap.

* * * * *